US012449470B2

(12) United States Patent
Monteiro Diniz Reis et al.

(10) Patent No.: US 12,449,470 B2
(45) Date of Patent: Oct. 21, 2025

(54) APPARATUS AND METHOD FOR MONITORING A SEMICONDUCTOR COMPONENT

(71) Applicant: Robert Bosch GmbH, Stuttgart (DE)

(72) Inventors: Daniel Monteiro Diniz Reis, Esslingen am Neckar (DE); Frank Schatz, Kornwestheim (DE); Mathias Mews, Reutlingen (DE); Timo Schary, Aichtal-Neuenhaus (DE)

(73) Assignee: ROBERT BOSCH GMBH, Stuttgart (DE)

( * ) Notice: Subject to any disclaimer, the term of this patent is extended or adjusted under 35 U.S.C. 154(b) by 147 days.

(21) Appl. No.: 18/249,039

(22) PCT Filed: Dec. 13, 2021

(86) PCT No.: PCT/EP2021/085451
§ 371 (c)(1),
(2) Date: Apr. 13, 2023

(87) PCT Pub. No.: WO2022/144166
PCT Pub. Date: Jul. 7, 2022

(65) Prior Publication Data
US 2024/0019482 A1    Jan. 18, 2024

(30) Foreign Application Priority Data
Jan. 4, 2021    (DE) .................... 10 2021 200 002.9

(51) Int. Cl.
*G01R 31/26*    (2020.01)
*G01R 31/52*    (2020.01)

(52) U.S. Cl.
CPC ......... *G01R 31/2601* (2013.01); *G01R 31/52* (2020.01)

(58) Field of Classification Search
CPC ................ G01R 31/2601; G01R 31/52; G01R 31/2642; G01R 31/2621; G01R 31/3277; H10D 1/682; H01L 21/76834; G05F 1/56
(Continued)

(56) References Cited

U.S. PATENT DOCUMENTS 6,348,806 B1    2/2002  Okandan et al.
10,818,370 B1   10/2020 Wang et al.
(Continued)

FOREIGN PATENT DOCUMENTS

DE    19836361 C1     3/2000
DE    102012215963 A1  3/2014
(Continued)

OTHER PUBLICATIONS

Monteiro Diniz Reis, et al.: Leakage Current in Low-Temperature PVD PZT Films, 2019 IEEE International Symposium on Applications of Ferroelectrics (ISAF), (2019), pp. 1-4, XP033740285.
(Continued)

*Primary Examiner* — Giovanni Astacio-Oquendo
(74) *Attorney, Agent, or Firm* — NORTON ROSE FULBRIGHT US LLP

(57) ABSTRACT

An apparatus and a method for monitoring a semiconductor component are disclosed. A leakage current which flows through a first electrode and a second electrode of the semiconductor component is detected during operation of the semiconductor component. During a comparison, the leakage current is compared with a first limit value for the leakage current and an output is determined on the basis of a result of the comparison and/or a time is determined at which an extreme point, in particular a maximum, of the leakage current occurs and an output is determined on the basis of the time. The output comprises a state of the semiconductor component, and the output is output.

16 Claims, 9 Drawing Sheets

(58) Field of Classification Search
USPC .................................................. 324/762.01
See application file for complete search history.

(56) References Cited

U.S. PATENT DOCUMENTS

| | | | |
|---|---|---|---|
| 11,513,165 B2* | 11/2022 | Sato | H02M 3/1588 |
| 2003/0111730 A1* | 6/2003 | Takeda | H01L 21/76834 |
| | | | 257/762 |
| 2008/0309365 A1 | 12/2008 | Liao et al. | |
| 2017/0083031 A1* | 3/2017 | Atallah | G05F 1/56 |
| 2019/0369157 A1 | 12/2019 | Chambion | |
| 2020/0091024 A1* | 3/2020 | Yanaura | H01L 23/24 |
| 2021/0270886 A1* | 9/2021 | Lichtenwalner | H01L 22/34 |
| 2022/0216298 A1* | 7/2022 | Monteiro Diniz Reis | |
| | | | H10D 1/682 |
| 2023/0408577 A1* | 12/2023 | Sobolewski | G01R 31/3008 |
| 2023/0417819 A1* | 12/2023 | Sagawa | H10D 62/8325 |
| 2025/0147095 A1* | 5/2025 | Pronin | G01R 31/2621 |

FOREIGN PATENT DOCUMENTS

| | | |
|---|---|---|
| DE | 102016109137 B3 | 6/2017 |
| JP | H0217462 A | 1/1990 |
| JP | 2010060305 A | 3/2010 |
| JP | 2012009800 A | 1/2012 |
| JP | 7383109 B2 | 11/2023 |
| JP | 7383110 B2 | 11/2023 |
| JP | 2024502090 A | 1/2024 |
| WO | 2016190110 A1 | 12/2016 |
| WO | 2019135247 A1 | 7/2019 |

OTHER PUBLICATIONS

International Search Report for PCT/EP2021/085451, Issued Apr. 11, 2022.

Monteiro Diniz Reis et al., "Leakage Current in Low-Temperature PVD PZT Films," 2019 IEEE International Symposium on Applications of Ferroelectrics (ISAF), IEEE, 2019, pp. 1-4.

* cited by examiner

APPARATUS AND METHOD FOR MONITORING A SEMICONDUCTOR COMPONENT

FIELD

The present invention relates to an apparatus and a method for monitoring a semiconductor component.

BACKGROUND INFORMATION

With respect to the lifetime of semiconductor components consisting of at least two electrodes and at least one intermediate dielectric layer and operated when applying an electrical voltage, dielectric breakdown is always a relevant factor. Another factor limiting the lifetime of the semiconductor component is the development of high leakage currents, or the drop in performance due to the destruction of the active area of the component.

SUMMARY

An apparatus and the method according to the present invention make it possible to monitor semiconductor components comprising dielectric layers during operation and not only detect their defects, but also make a prediction of the remaining useful life. In addition to the kinetics up to a dielectric breakdown, inferences about a degradation sequence following the dielectric breakdown are made possible as well. Thus a lifetime monitoring is realized, which includes a leakage current development and a development of the performance on the basis of a leakage current level and/or a first breakdown "first peak" and/or a performance of the semiconductor component, here a polarization.

According to an example embodiment of the present invention, the method for monitoring a semiconductor component provides that leakage current which flows through a first electrode and a second electrode of the semiconductor component is detected during operation of the semiconductor component, wherein the leakage current is compared during a comparison with a first limit value for the leakage current and an output is determined on the basis of a result of the comparison and/or wherein a time is determined at which an extreme point, in particular a maximum, of the leakage current occurs and an output is determined on the basis of the time, wherein the output includes a state of the semiconductor component, and the output is output. This allows an internal state of the semiconductor component to be made accessible for lifetime monitoring.

According to an example embodiment of the present invention, it can be provided that the first limit value which the leakage current exceeds or falls below is determined from a plurality of limit values, wherein a residual value of a service life of the semiconductor component is determined depending on the first limit value wherein the output includes the residual value.

According to an example embodiment of the present invention, it can be provided that a residual value of a service life of the semiconductor component is determined depending on the time at which the extreme point, in particular the maximum, of the leakage current occurs, wherein the output includes the residual value.

According to an example embodiment of the present invention, it can be provided that the leakage current is detected during operation of the semiconductor component in a first operating mode, wherein the operation of the semiconductor component in the first operating mode is continued if the leakage current exceeds the first limit value or if the residual value of the service life is greater than a first threshold value.

According to an example embodiment of the present invention, it can be provided that a second limit value is determined from the plurality of limit values, wherein the operation of the semiconductor component is continued in a second operating mode or the operation is terminated if the leakage current exceeds the second threshold value or that the operation of the semiconductor component is continued in a second operating mode or the operation is terminated if the residual value of the service life is greater than a second threshold value.

According to an example embodiment of the present invention, it can be provided that a reference limit value and a reference temperature are specified, a current temperature of the semiconductor component or an environment of the semiconductor component is determined, a factor is determined depending on the current temperature and the reference temperature, the reference limit value is scaled with the factor, and the first limit value and/or the second limit value is determined depending on the reference limit value scaled with the factor.

According to an example embodiment of the present invention, it can be provided that a text including the state of the semiconductor component and an indication of a remaining service life is determined, wherein the text is sent in a message or output at a human-machine interface.

According to an example embodiment of the present invention, it can be provided that a control signal specifying an operating mode for the semiconductor component is determined, wherein the control signal is output to control the semiconductor component or a device comprising the semiconductor component to operate in the operating mode.

According to an example embodiment of the present invention, an apparatus for monitoring the semiconductor component comprises a measuring device, a computing device and an output device, wherein the measuring device is configured to detect a leakage current which flows through a first electrode and a second electrode of the semiconductor component during operation of the semiconductor component, wherein the computing device is configured to compare the leakage current during a comparison with a first limit value for the leakage current and determine an output depending on a result of the comparison and/or wherein the computing device is configured to determine a time at which an extreme point, in particular a maximum, of the leakage current occurs and determine an output depending on the time, wherein the output includes a state of the semiconductor component, and wherein the output device is configured to output the output.

The present invention also relates to a microelectromechanical system, MEMS, a memory, an actuator, a micromirror, a printhead or a speaker comprising this apparatus for monitoring a semiconductor component and the semiconductor component.

Further advantageous embodiments of the present invention will become apparent from the following description and the figures.

DETAILED DESCRIPTION OF EXAMPLE EMBODIMENTS

Figure 1:
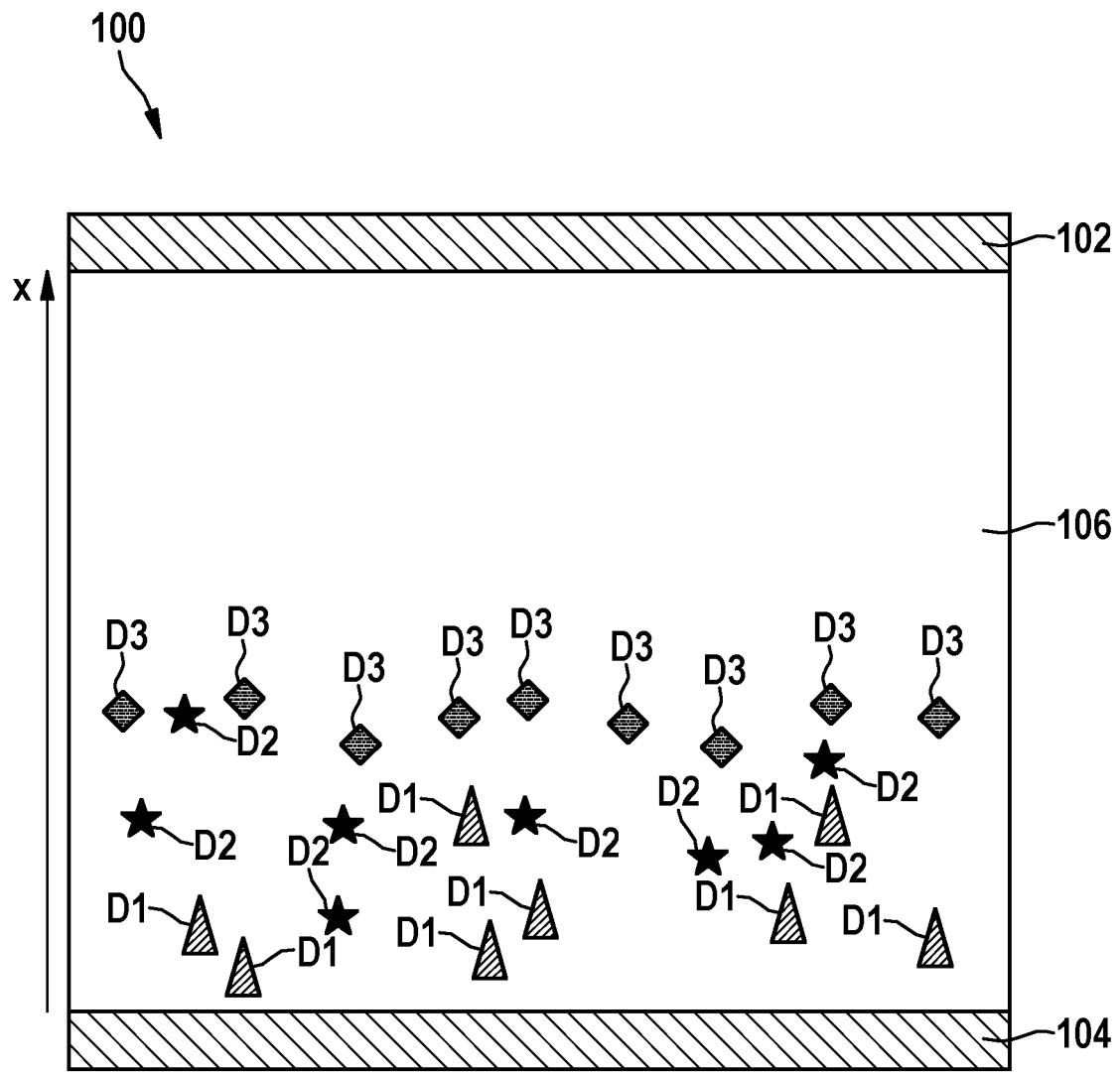
FIG. 1 shows a schematic illustration of a semiconductor component.

The following description uses knowledge of a failure mechanism in dielectric layers to derive a prediction of a remaining service life from measurable changes during operation of a semiconductor component comprising one dielectric layer or multiple dielectric layers. In safety-related applications, this can be used to output individual, use-specific maintenance instructions or warnings.

Conventional lifetime information, maintenance intervals or active monitoring of components are designed to prevent critical failures by means of early replacement, or to indicate a defect when it is already too late and the component has failed. The specified maintenance/replacement intervals are ascertained statistically and often reflect very conservative limit values for the entirety of all parts under an assumed average load profile. Load profiles are crucial, but can only be estimated.

In contrast, it was found according to the present invention that, in such semiconductor components, there is a deterministic or predictable degradation profile in which a continuous failure or a gradual behavior can be observed. Using this knowledge of the behavior, the component can be specifically monitored. A warning or controlled replacement can be scheduled at defined limit values. Maintenance and replacement can thus be ascertained in a component-specific manner and depending on an actual load profile. This is an advantage for a customer who does not replace a component until it is actually necessary.

The gradual behavior can be a gradual increase in leakage current, for example, or a gradual drop in power/performance.

Leakage current can occur in semiconductor components comprising a dielectric layer disposed between two electrodes. A leakage current profile changes as a result of an accumulation of defects on a boundary layer between a dielectric material of the dielectric layer and one of the electrodes, for example. Defects that accumulate on the boundary layer affect a barrier height. With knowledge of an initial barrier height and the parameters that describe a space-charge-limited current component, it is possible to map a time profile of the leakage current. It is also possible to describe the leakage current profile before and after a first dielectric breakdown. Because there is a correlation between leakage current degradation and performance degradation, it is moreover possible to describe a loss of performance.

In one aspect of the present invention, the leakage current is monitored. In one aspect of the present invention, a performance of the semiconductor component is monitored.

It can be provided that monitoring includes evaluating a leakage current level and defining a first limit value, after which a warning is generated and the lifetime still has a desired residual value.

It can be provided that the monitoring includes determining a time at which a first breakdown, first peak, has occurred and outputting a warning comprising an estimate of a remaining useful life that results from the development of the leakage current level or the loss of performance, in particular depending on defined product-specific limit values.

Because the load profile plays a major role even after the first limit value has been reached, multiple limit values can be defined and active monitoring can be continued.

FIG. 1 is a schematic illustration of a semiconductor component 100. The semiconductor component 100 includes a first electrode 102, a second electrode 104 and a dielectric layer 106.

The dielectric layer 106 is disposed between the first electrode 102 and the second electrode 104. In this example, the first electrode 102 and the second electrode 104 are disposed on opposite sides of the dielectric layer 106.

In this example, defects D1 of a first defect type, defects D2 of a second defect type and defects D3 of a third defect type are present in the dielectric layer 106. It is also possible for only defects D1 of the first defect type or only defects of two different defect types to be present. It is moreover possible for defects of more than three defect types to be present. In this example, the defects are disposed in an initial position. The initial position in this example is defined by a manufacturing process of the dielectric layer. In this example, the defects are disposed at different distances from the first electrode 102 or the second electrode 104, respectively.

The defects are charged defects that, when a potential is applied between the first electrode 102 and the second electrode 104, move in accordance with their charge to a respective boundary layer between the dielectric layer 106 and either the first electrode 102 or the second electrode 104. The boundary layer is referred to in the following as the "interface". This transport of the charged defects is determined by defect properties and a "hopping mechanism".

Hopping mechanism in this context means that a displacement, i.e., hopping, of the defects takes place in an electrical field E which acts in the dielectric layer 106 of the thickness d as a result of the respective applied voltage U. Defects of a defect type i move along localized defect states with an average effective distance $a_i$. This leads to a velocity $v_i$ of the movement of the defects of the defect type i. The velocity $v_i$ is described via the conventional variable-range hopping approach:

$$v_i = C_{0,i}(a_i) e^{-\frac{E_{A,0,i}}{k_B T}} \sinh\left(\frac{N_{q,i} a_i E}{k_B T}\right) \text{ with } E = \frac{U}{d}$$

$$C_{0,i}(a_i) = v_0 a_i e^{-\frac{2a_i}{\alpha}}$$

$C_{0,i}(a_i)$ represents a function that describes an influence of a local defect distribution on a characteristic velocity $v_i$ of the defects in the dielectric layer 106. This defect distribution describes a property of the dielectric layer 106. This property determines the movement of the defects of defect type i in the dielectric layer 106. The parameters decay length $\alpha$, average effective distance $a_i$, activation energy $E_{A,0,i}$, electrical charge $N_{q,i}$ of the defects of defect type i are physical properties. $k_B$ is the Boltzmann constant. T is the ambient temperature of the defect under consideration, in particular the temperature in the dielectric layer 106.

A time profile of a leakage current density $J_{TED}$ up to dielectric failure can be determined via the equation of the thermionic emission diffusion theory according to Crowell and Sze:

$$J_{TED} = \frac{qN_C v_R}{1 + \frac{v_R}{v_D}} e^{-\frac{\Phi_B^{eff}}{k_B T}} \left[ e^{\frac{qU}{k_B T}} - 1 \right]$$

q is the unit charge, $N_c$ is the effective density of states in the conduction band, $v_R$ is the effective recombination velocity, $v_D$ is the effective diffusion velocity, $\phi_B^{eff}$ is the effective Schottky barrier, $k_B$ is the Boltzmann constant, T is the ambient temperature, and U is voltage across the dielectric layer 106.

Defects i with a positive charge migrate to the electrode having a negative potential and accumulate on the interface. Defects i with a negative charge move to the electrode having a positive potential and accumulate on the interface. This changes the effective Schottky barrier $\phi_B^{eff}$.

A change in the barrier height $\Delta\phi_i$ produced by defects i is characterized by its maximum height $\delta\phi_i$ and a characteristic time constant x. The characteristic time constant $\tau_i$ defines a period of time in which the change in the barrier height $\Delta\phi_i$ changes the most over time t:

$$\Delta\Phi_i(t) = \delta\Phi_i \left(1 - e^{\frac{t}{\tau_i}}\right)$$

The maximum height $\delta\phi_i$ is a function of a number $Z_i$ of defects i and depends on a type of the interface. The term $$\left(1 - e^{\frac{t}{\tau_i}}\right)$$

describes the time-dependent accumulation of a statistical distribution of the defects i in the material, in particular the time of accumulation of the respective initial position. In this example, the initial position represents a center of gravity of the distribution. If there are multiple accumulations for the defects of defect type i, one of the accumulations can be selected that defines the initial position instead of the center of gravity. Preferably, the accumulation that has the greatest influence on the increase in lifetime is selected.

Defects of various defect types can be present in the dielectric layer 106. There may be defects which, due to their charge, cause a change in the barrier height $\Delta\phi_i$ that increases the effective Schottky barrier $\phi_B^{eff}$. This lowers the leakage current level. These are referred to in this context as "restoring" defects, for example. There may be defects which, due to their charge, cause a change in the barrier height $\Delta\phi_i$ that reduces the effective Schottky barrier $\phi_B^{eff}$. This increases the leakage current level. These are referred to in this context as "degrading" defects, for example.

When a voltage is applied, the defects are moved. The activation energy and charge can cause certain defects to be much faster.

A starting position of defects i is defined in this example by a distance $d_i$ of the center of gravity of their distribution to the interface, toward which the defects i tend to move during normal operation of the semiconductor component 100.

The time constant $\tau_i$ can be different for the movement under the influence of a first voltage U1 than for the movement under the influence of a second voltage U2. The time constant $\tau_i$ can be defined by a mobility of the defects i under the influence of the electric field E in the dielectric layer 106 and by the distance to be traveled in the dielectric layer 106 until the respective interface is reached. During the displacement inside the dielectric layer 106, defect type i has to travel the distance $d_i$ of the center of gravity of its distribution to the interface. Together with the velocity, $v_i$ the characteristic time constant $\tau_i$ for the accumulation process of the defects results in $$\tau_i = \frac{d_i}{v_i}$$

The time constant $\tau_i$ can be determined from a measurement of the leakage current over time and evaluation of the time-dependent profile by means of the equations of the thermionic emission diffusion theory according to Crowell and Sze and the time-dependent behavior of the change in the barrier height. The activation energy $E_{A,0,i}$ and the electrical charge $N_{q,i}$ of the defects of the defect type i can be determined by means of multiple measurements of $\tau_i$ at different temperatures T and voltages U.

When the first electrical voltage U1 is applied with a first polarity, the charged defects move in a first direction toward the first electrode 102. When the second electrical voltage U2 is applied with a polarity opposite to the first electrical voltage U1, these charged defects move in a second direction toward the second electrode 102.

Charged defects that reach the interface at the first electrode 102 or the second electrode 104 accumulate on the interface.

The semiconductor component 100 can comprise more than two electrodes. The semiconductor component 100 can comprise more than one dielectric layer between two respective electrodes.

In such semiconductor components, dielectric breakdown is possible if they are operated under application of an electrical voltage. When a dielectric breakdown occurs, the interface is partially or completely destroyed. When a dielectric breakdown occurs, a service life of the semiconductor component 100 is reduced. Dielectric breakdown occurs, for instance, when a number of charged defects accumulating on the interface exceeds the voltage-dependent threshold value.

Optimizing process conditions and/or process management during production of the dielectric layer 106 makes it possible to influence physical properties and production-specific influences on said physical properties. This can extend the service life.

The process conditions and/or the process management affect growth, the growth conditions and a material composition, for example. The process conditions and/or the process management result, for example, in intentional or unintentional doping and/or contamination during the growth process or in subsequent processes.

Figure 2:
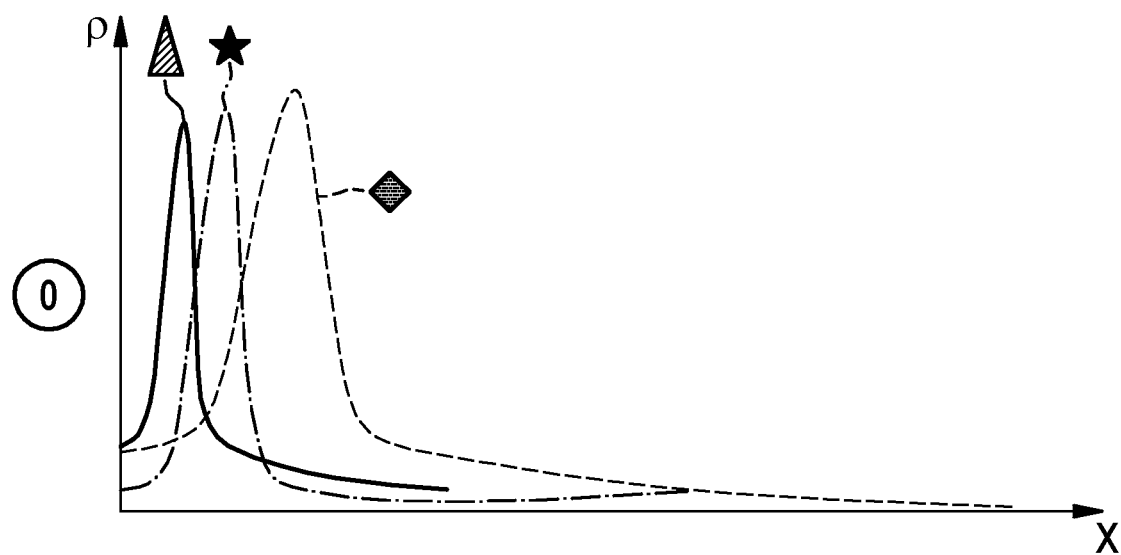
FIG. 2 shows a first state for a first distribution of defects.

FIG. 2 shows a first state for a first distribution p of defects over a distance x from the second electrode 104. In this example, the first state is an initial state. A distribution of the defects D1 of the first defect type is labeled in FIG. 2 and the following figures with a triangle symbol. A distribution of the defects D2 of the second defect type is labeled in FIG. 2 and the following figures with a star symbol. A distribution of the defects D3 of the third defect type is labeled in FIG. 2 and the following figures with a diamond symbol.

Figure 3:
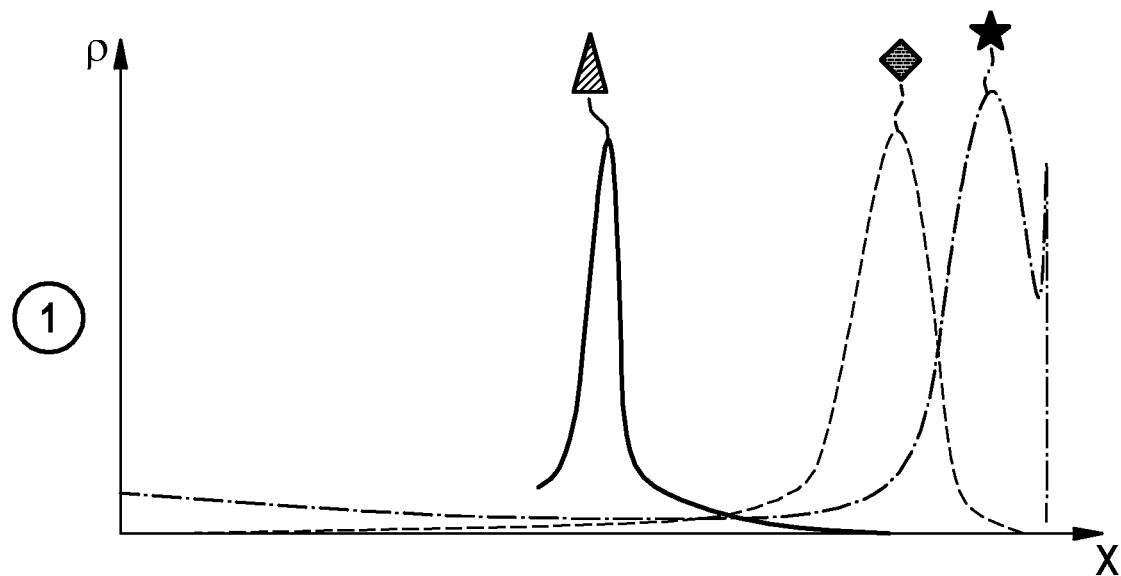
FIG. 3 shows a second state for the first distribution of defects.

FIG. 3 shows a second state for the first distribution p of defects over the distance x from the second electrode 104. In this example, the second state is an operating state which follows the initial state during operation of the semiconductor component 100 with the first voltage U1 before a first breakdown, in which defects D2 of the second defect type are already accumulating on the interface of the first electrode 102.

Figure 4:
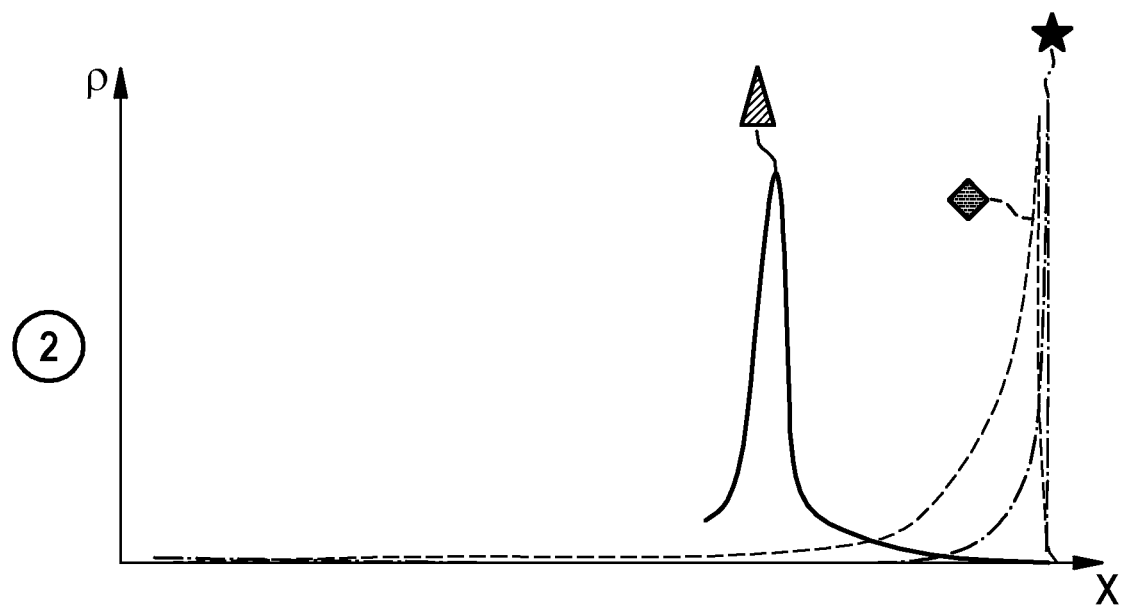
FIG. 4 shows a third state for the first distribution of defects.

FIG. 4 shows a third state for the first distribution p of defects over the distance x from the second electrode 104. In this example, the third state is an operating state which follows the second state during operation of the semiconductor component 100 with the first voltage U1 before a first breakdown, in which defects D2 of the second defect type and defects D3 of the third defect type are already accumulating on the interface of the first electrode 102. In this example, it is still possible in this situation to extend a service life of the semiconductor component by taking measures that move the defects away from the interface.

Figure 5:
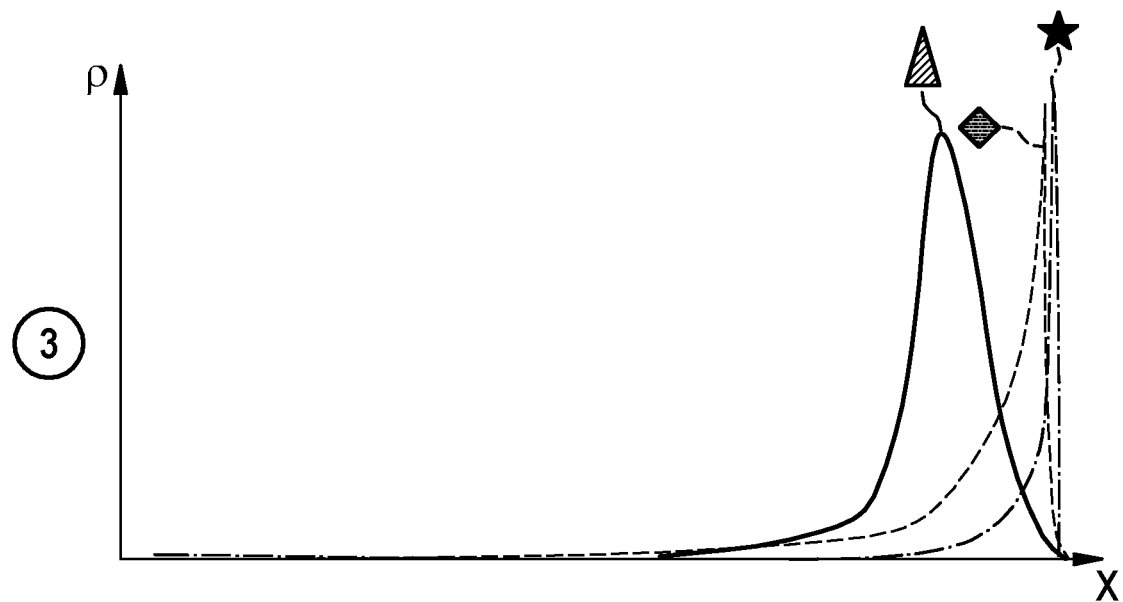
FIG. 5 shows a fourth state for the first distribution of defects.

FIG. 5 shows a fourth state for the first distribution p of defects over the distance x from the second electrode 104. In this example, the fourth state is an operating state which follows the third state during operation of the semiconductor component 100 with the first voltage U1 before a first breakdown, in which defects D2 of the second defect type and defects D3 of the third defect type are already accumulating on the interface of the first electrode 102 and defects D1 of the first defect type are reaching the interface. In this example, it is still possible in this situation to output a warning prior to a loss of performance.

Figure 6:
FIG. 6 shows a fifth state for the first distribution of defects.

FIG. 6 shows a fifth state for the first distribution p of defects over the distance x from the second electrode 104. In this example, the fifth state is an operating state which follows the fourth state during operation of the semiconductor component 100 with the first voltage U1, in which defects D1 of the first defect type, defects D2 of the second defect type and defects D3 of the third defect type are accumulating on the interface of the first electrode 102 and loss of performance is occurring.

Figure 7:
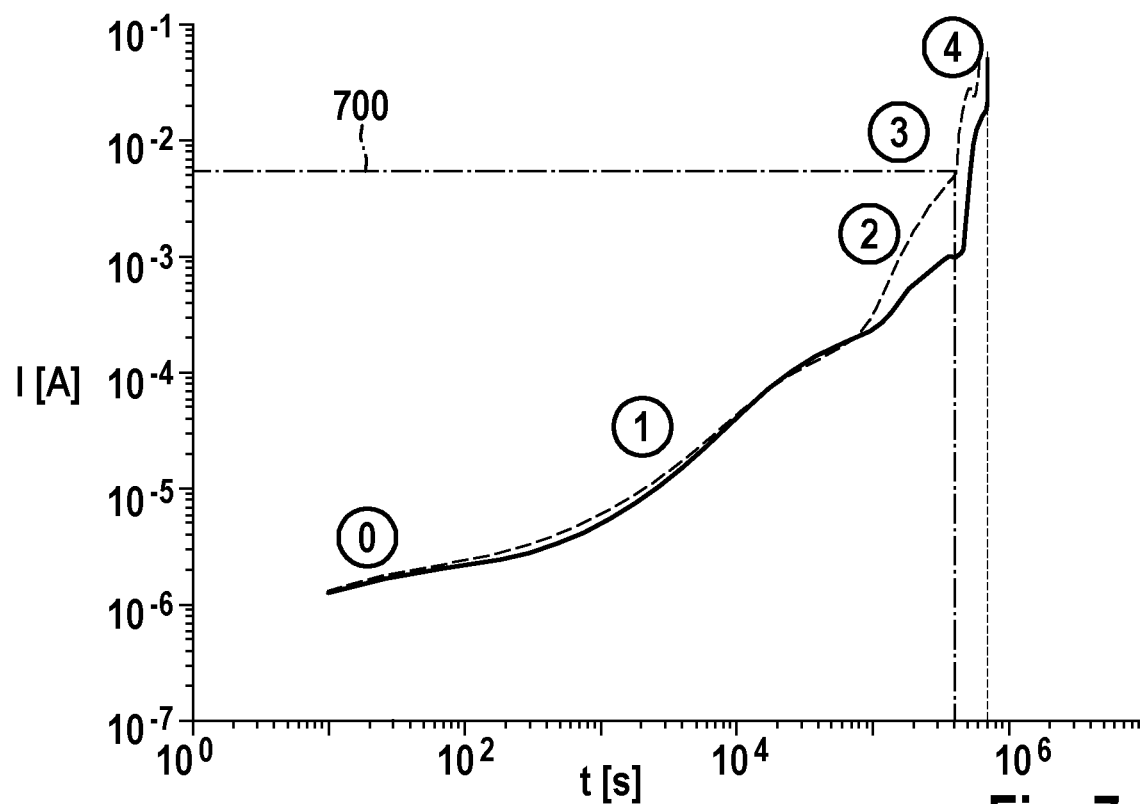
FIG. 7 shows a first profile of a leakage current level according to the first distribution.

FIG. 7 shows a profile of a leakage current level I over time t for early detection of a remaining useful life. In the example shown in FIG. 7, the loss of performance occurs starting from the initial state after approximately $10^6$ seconds of operation with the first voltage U1.

The leakage current levels I for the states described in FIGS. 2 to 6 are identified in FIG. 7 as examples. The first state is labeled 0, the second state is labeled 1, the third state is labeled 2, the fourth state is labeled 3 and the fifth state is labeled 4.

An example of a leakage current level 700 is provided for early detection of the remaining useful life, and when it is reached a warning, for instance, is output.

Figure 8:
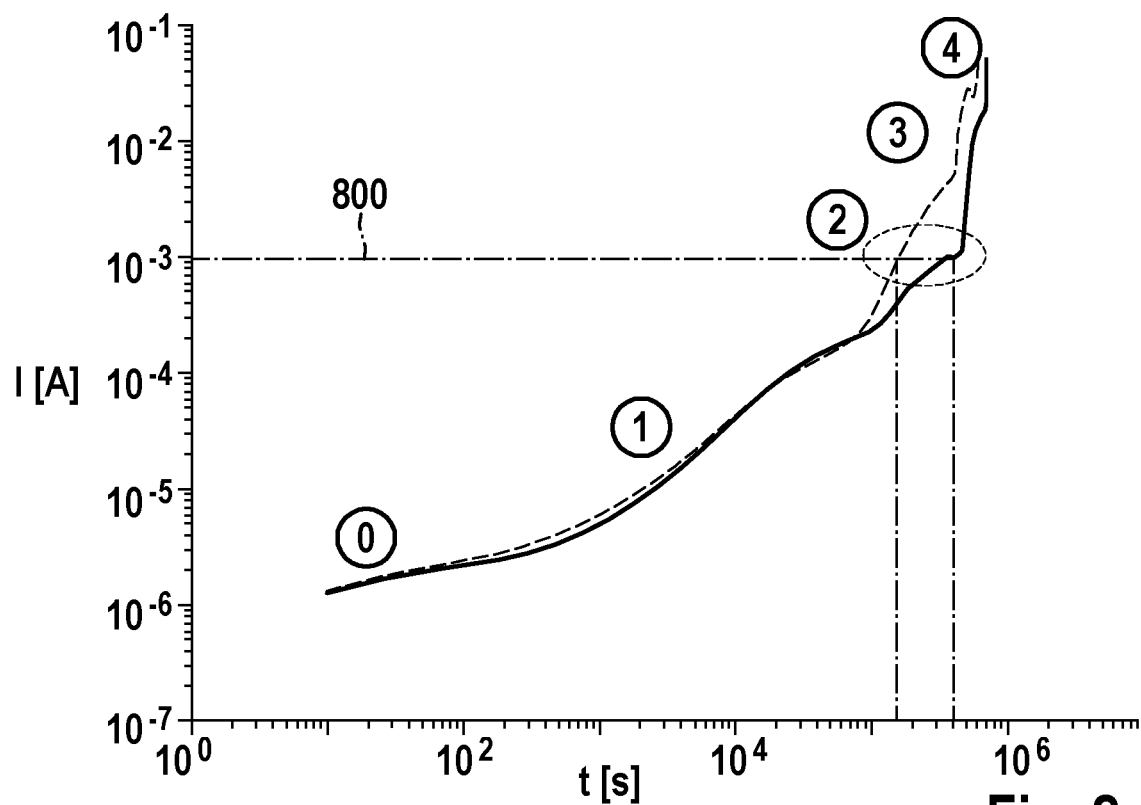
FIG. 8 shows a second profile of a leakage current level according to the first distribution.

FIG. 8 shows a profile of a leakage current level I over time t for introducing an electrical load with the second voltage U2 for a reversal of the defect accumulation. In the example shown in FIG. 8, the loss of performance occurs starting from the initial state after approximately $10^6$ seconds of operation with the first voltage U1.

The leakage current levels I for the states described in FIGS. 2 to 6 are identified in FIG. 8 as examples. The first state is labeled 0, the second state is labeled 1, the third state is labeled 2, the fourth state is labeled 3 and the fifth state is labeled 4.

An example of a leakage current level 800 is provided for the electrical loading with the second voltage U2 for the reversal of the defect accumulation, which is started when said level is reached.

Figure 9:
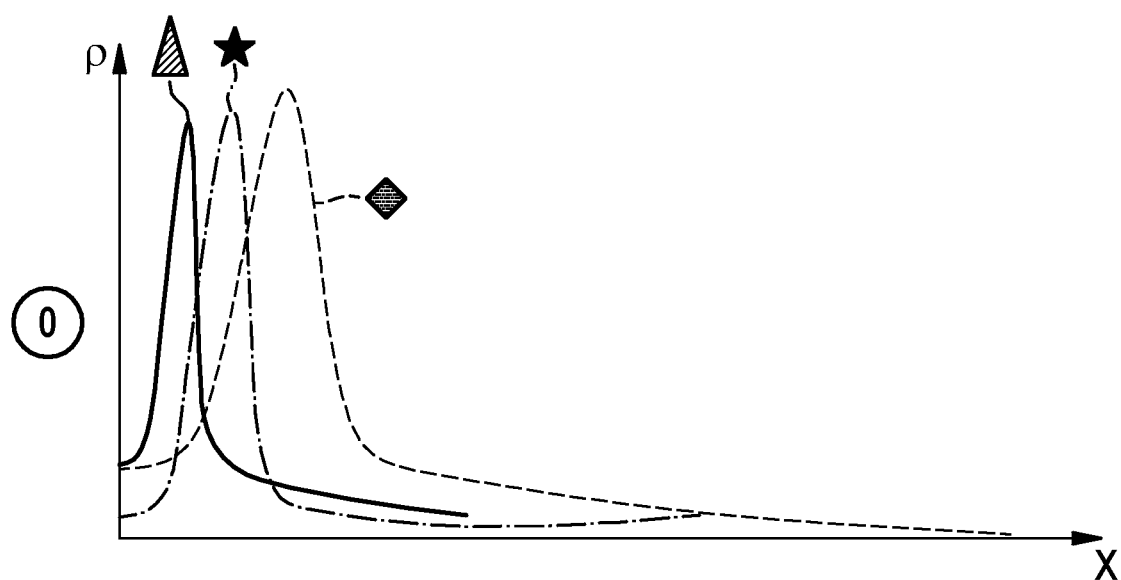
FIG. 9 shows a first state for a second distribution of defects.

FIG. 9 shows a first state for a second distribution p of defects over a distance x from the second electrode 104. In this example, the first state is an initial state. A distribution of the defects D1 of the first defect type is labeled in FIG. 9 and the following figures with a triangle symbol. A distribution of the defects D2 of the second defect type is labeled in FIG. 9 and the following figures with a star symbol. A distribution of the defects D3 of the third defect type is labeled in FIG. 9 and the following figures with a diamond symbol.

Figure 10:
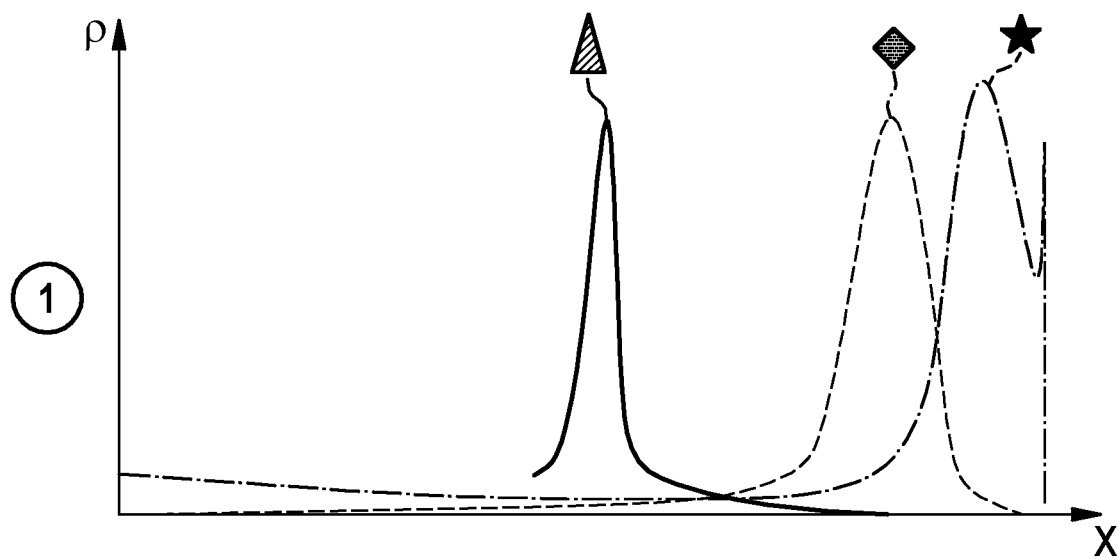
FIG. 10 shows a second state for the second distribution of defects.

FIG. 10 shows a second state for the second distribution p of defects over the distance x from the second electrode 104. In this example, the second state is an operating state which follows the initial state during operation of the semiconductor component 100 with the first voltage U1 before a first breakdown, in which defects D2 of the second defect type are already accumulating on the interface of the first electrode 102.

Figure 11:
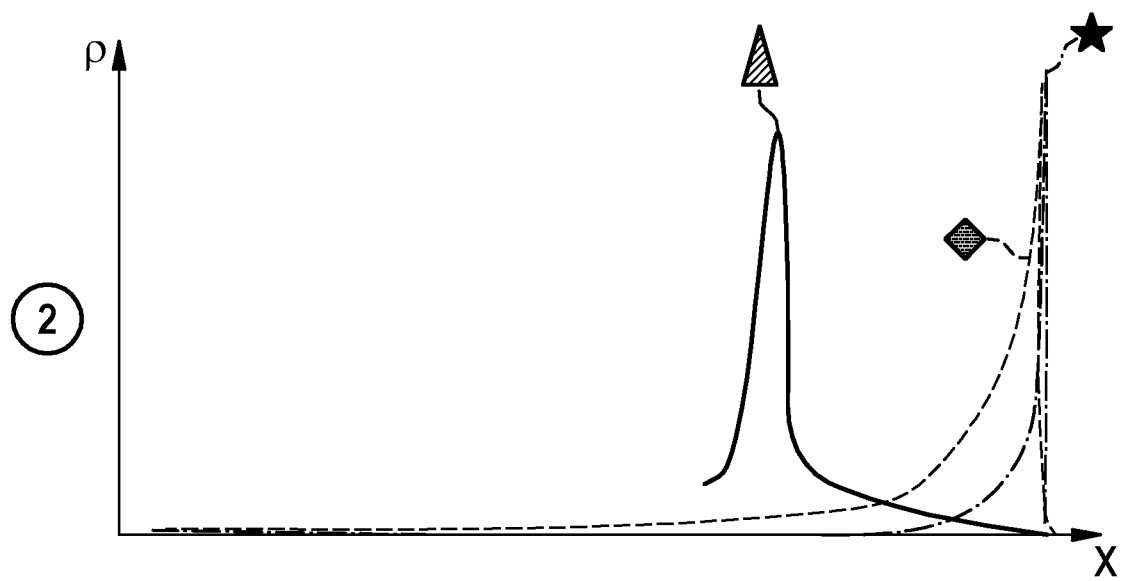
FIG. 11 shows a third state for the second distribution of defects.

FIG. 11 shows a third state for the second distribution ρ of defects over the distance x from the second electrode 104. In this example, the third state is an operating state which follows the second state during operation of the semiconductor component 100 with the first voltage U1 at an early stage of the loss of performance, in which defects D2 of the second defect type and defects D3 of the third defect type are already accumulating on the interface of the first electrode 102. In this example, it is possible in this situation to trigger an early warning, based on which maintenance of the semiconductor component 100 is carried out. The limit value for the early warning is, for example, selected such that the warning is triggered when approximately 10% of the service life of the semiconductor component 100 starting from the initial state has elapsed. The loss of performance in this example is not yet noticeable at this point in time, because every individual breakdown usually destroys only a very small area. Even though this can be detected in the current, in terms of a function of a product, e.g., an actuation system product comprising the semiconductor component 100, it is not noticeable.

Figure 12:
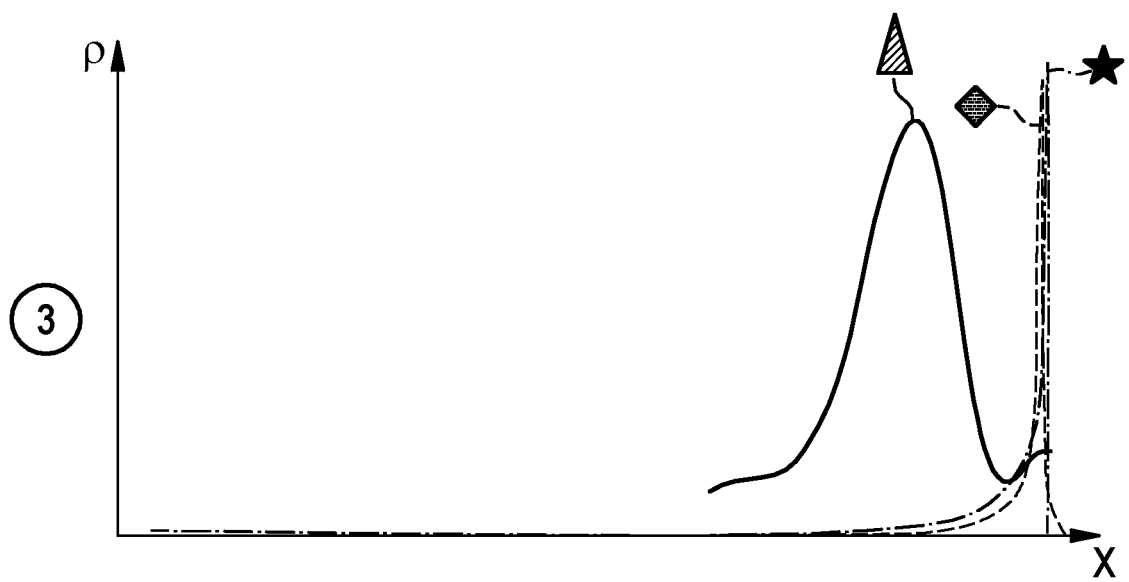
FIG. 12 shows a fourth state for the second distribution of defects.

FIG. 12 shows a fourth state for the second distribution p of defects over the distance x from the second electrode 104. In this example, the fourth state is an operating state which follows the third state during operation of the semiconductor component 100 with the first voltage U1 before a first breakdown, in which defects D2 of the second defect type and defects D3 of the third defect type are already accumulating on the interface of the first electrode 102 and defects D1 of the first defect type are reaching the interface. In this example, it is possible in this situation to trigger a critical warning, based on which maintenance of the semiconductor component 100 is carried out. The limit value for the early warning is, for example, selected such that the warning is triggered when approximately 50% of the service life of the semiconductor component 100 starting from the initial state has elapsed. In this example, multiple local breakdowns have already occurred in this state. The leakage current level is then significantly higher and detectable. The total area destroyed by many local breakdowns is now noticeable in the % range of the function of the product. Therefore, for example, the warning is issued. In this state in this example, the semiconductor component 100 or the product is still far from failure.

Figure 13:
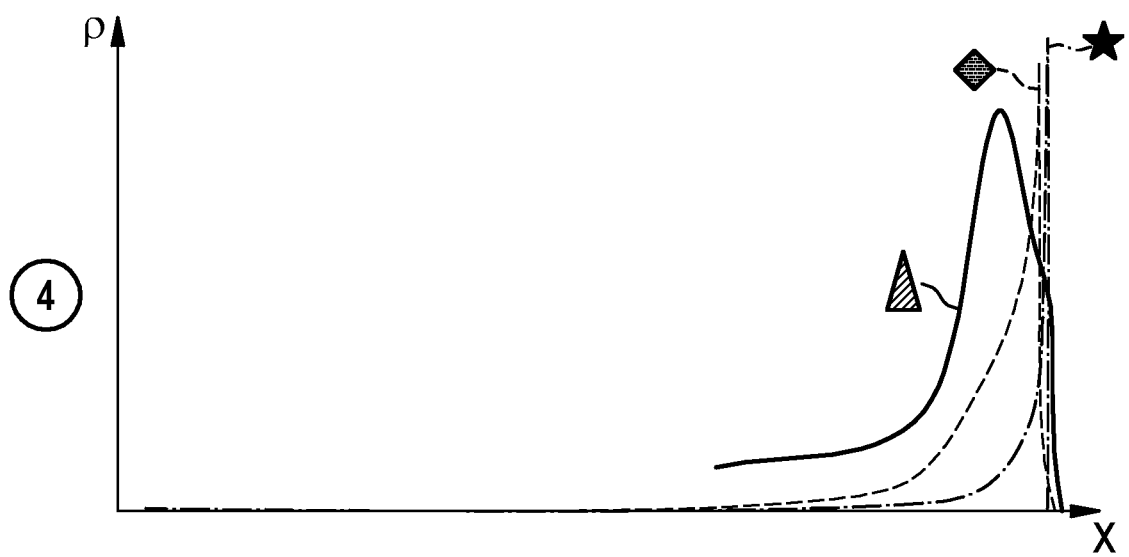
FIG. 13 shows a fifth state for the second distribution of defects.

FIG. 13 shows a fifth state for the second distribution p of defects over the distance x from the second electrode 104. In this example, the fifth state is an operating state which follows the fourth state during operation of the semiconductor component 100 with the first voltage U1, in which defects D1 of the first defect type, defects D2 of the second defect type and defects D3 of the third defect type are accumulating on the interface of the first electrode 102 and a massive loss of performance is occurring. In this example, this is the time at which the service life of the semiconductor component 100 ends.

The end of service life refers to the time at which the semiconductor component 100 can no longer be used as intended. This limit can be different for different applications.

Figure 14:
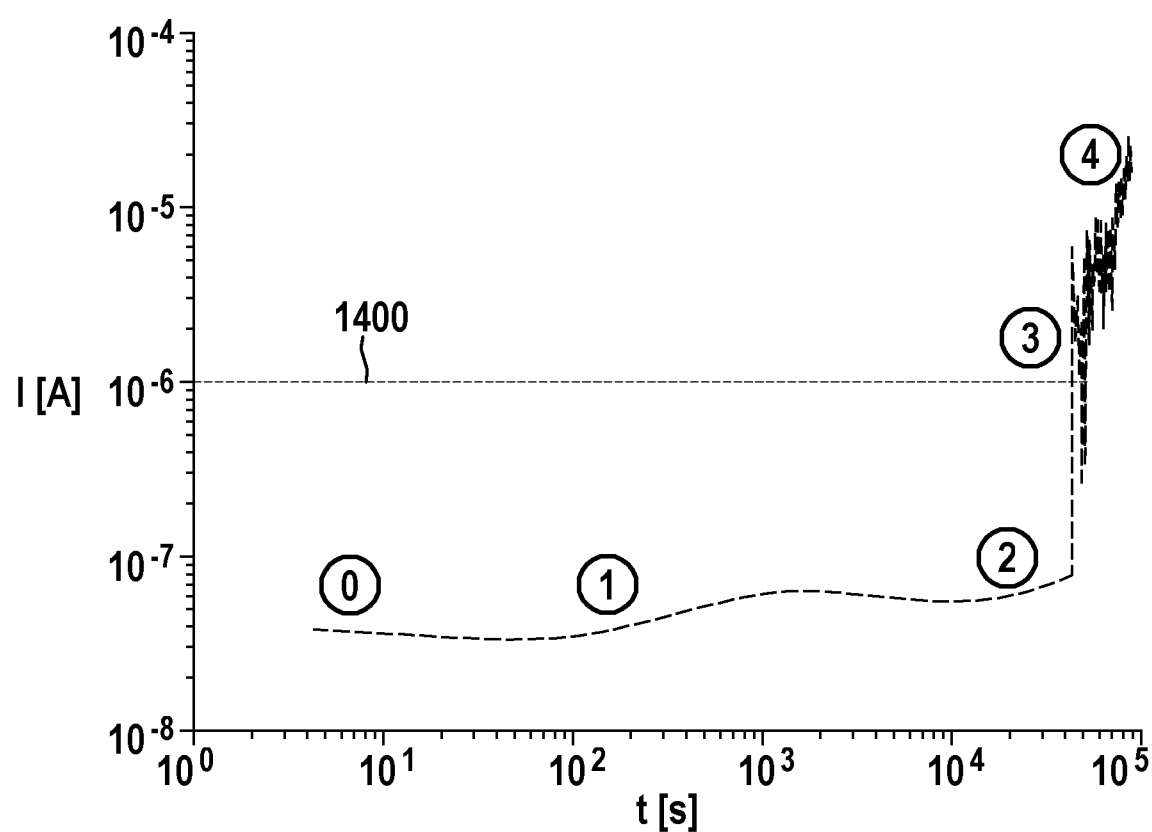
FIG. 14 shows a profile of a leakage current level according to the second distribution.

FIG. 14 shows a profile of a leakage current level I over time t. In the example shown in FIG. 14, the loss of performance increases starting from the initial state and reaches the end of service life after approximately $9*10^4$ seconds of operation with the first voltage U1. The end of service life depends on the material and the conditions. The end of service life in this example is later than the fourth state, but a loss of performance can still be small even after the fifth state has been reached.

The leakage current levels I for the states described in FIGS. 9 to 13 are identified in FIG. 14 as examples. The first state is labeled 0, the second state is labeled 1, the third state is labeled 2, the fourth state is labeled 3 and the fifth state is labeled 4.

An example of a leakage current level 1400 is provided for a critical warning, and when it is reached the critical warning, for instance, is output.

Figure 15:
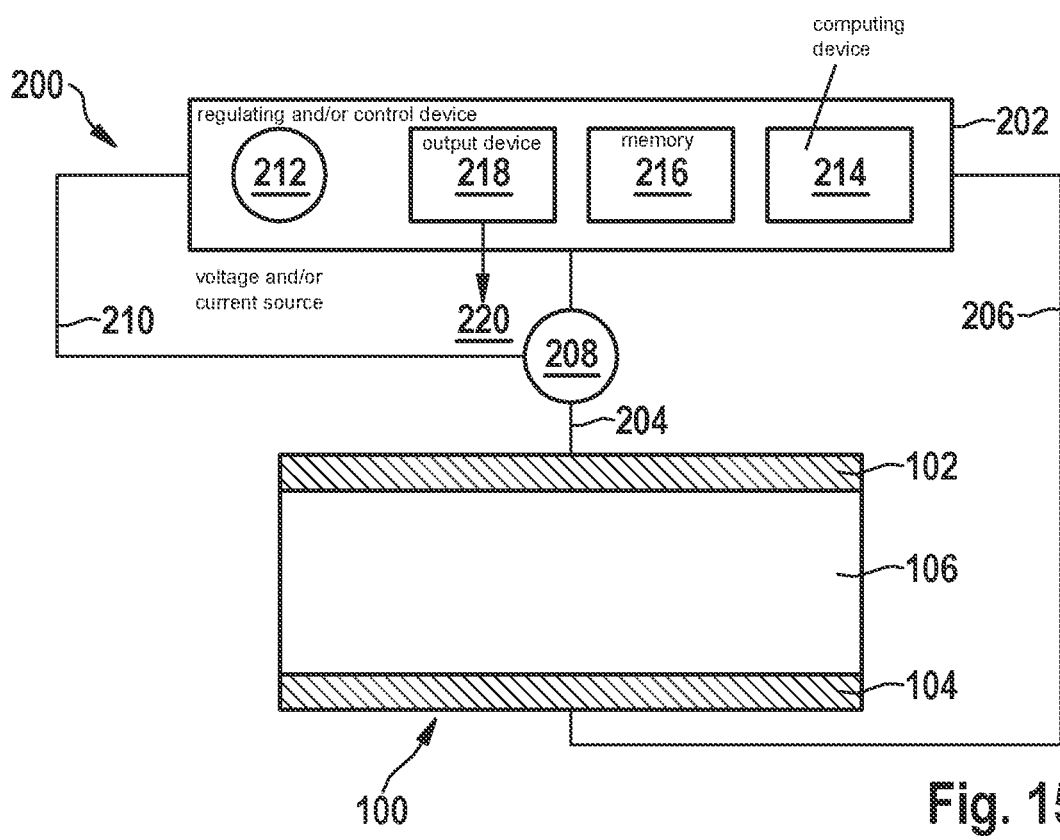
FIG. 15 shows an apparatus for monitoring the semiconductor component, according to an example embodiment of the present invention.

FIG. 15 schematically shows an apparatus 200 for producing the semiconductor component 100 according to the first embodiment.

The apparatus 200 includes a regulating and/or control device 202 which is configured to carry out steps in a method for monitoring the semiconductor component 100 described in the following. The apparatus 200 can be connected at least temporarily to the first electrode 102 of the semiconductor component 100 via a first conductor 204. The apparatus 200 can be connected at least temporarily to the second electrode 104 of the semiconductor component 100 via a second conductor 206.

In this example, the regulating and/or control device 202 is configured to output a first voltage U1 with a first polarity. In this example, the first voltage U1 is applied between the first electrode 102 and the second electrode 104 when these are connected to the apparatus 200 with the respective conductor and the regulating and/or control device 202 outputs the first voltage U1.

The regulating and/or control device 202 is optionally configured to output a second voltage U2 with a polarity opposite to the first polarity. In this example, the second voltage U2 is applied between the first electrode 102 and the second electrode 104 when these are connected to the apparatus 200 with the respective conductor and the regulating and/or control device 202 outputs the second voltage U2.

The control device can be configured to output an AC voltage or a substantially constant value for the first voltage U1 and/or the second voltage U2. This value is in the range of 1 volt to volts, for example, and is preferably 1 volt, 2 volts or 5 volts or 10 volts or 20 volts or 40 or 80 volts.

The dielectric layer 106 is preferably configured as a polycrystalline oxidic high-k dielectric.

The dielectric layer 106 is in particular configured as a PZT layer. PZT refers to $Pb(Zr_xTi_{1-x})O_3$.

The dielectric layer 106 is in particular configured as a KNN layer. KNN refers to $(K_xNa_{1-x})NbO_3$.

The dielectric layer 106 can in particular be configured as an $HfO_2$, $HfZrO_2$, $ZrO_2$, $BaTiO_3$, $SrTiO_3$ or $(Ba_xSr_{1-x})TiO_3$ layer.

The dielectric layer 106 is preferably doped. For example, the dielectric layer 106 is a PZT layer doped with nickel:

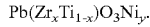
$$Pb(Zr_xTi_{1-x})O_3Ni_y.$$

Both the PZT layer and the KNN layer can have dopants other than nickel, for example Nb, La, Mn, Mg.

The dielectric layer is preferably configured as a sputtered PZT layer. The so-called target material is deposited on a substrate in a plasma. PZT is used as the target material, for example. In this context, the sputtered PZT layer preferably has a deposition temperature of less than 500° C.

The thickness of the dielectric layer is preferably in the range of 500 nm to 4 µm. This is a useful range for actuation systems. The layer thickness is preferably 1 µm or 4 µm. Larger layer thicknesses are possible as well. The described procedure can be carried out for all layer thicknesses.

Larger layer thicknesses are possible too. For applications other than actuation systems, for example, the thickness of the dielectric layer is preferably in the range less than 500 nm. One example of this is the use of high-k dielectrics, e.g. as a memory. The memory can be a resistive random access memory, ReRAM, or a ferroelectric random access memory, FeRAM. For these other applications, thicknesses of 15 nm-200 nm are useful depending on the application.

Very thin high-k dielectrics with layers can furthermore be used in very many applications, e.g. as gate oxides. HfO2 or SiO2 with a layer thickness of less than or equal to 50 nm can be provided as a dielectric layer 106, for example.

The regulating device can be configured to set a target value for the first voltage U1. This target value is in the range of 1 volt to 80 volts, for example, and is preferably 1 volt, 2 volts or 5 volts or 10 volts or 20 volts or 40 or 80 volts.

The regulating device can be configured to set a target value for the second voltage U2. This target value is in the range of 1 volt to 80 volts, for example, and is preferably 1 volt, 2 volts or 5 volts or 10 volts or 20 volts or 40 or 80 volts.

A voltage measuring device can then be provided, which is configured to record the voltage between the first electrode 102 and the second electrode 104. In this case, the regulating device is configured to reduce a control deviation, which is determined as a function of a difference between said recorded voltage and the target value.

In this example, the apparatus 200 optionally comprises a measuring device 208. The measuring device 208 in this example is configured to measure the current that flows through the first electrode 102 and the second electrode 104.

In this example, the measuring device 208 is disposed in the first conductor 204. A corresponding placement in another location is possible as well.

In this example, the measuring device 208 is connected via a signal line 210 to the regulating and/or control device 202 to transmit the measured current.

The leakage current is strongly temperature-dependent. It can be provided that the measuring device 208 comprises a device for determining a current temperature T. A temperature measurement is carried out at the semiconductor component 100 or in its immediate vicinity. The limit value G at temperature T is determined in this aspect as a function of a reference limit value G0 at a reference temperature T0 according to the following exponential relationship:

$$G(T, T0) = G0 * \frac{e^{\left(-\frac{k}{k_B T}\right)}}{e^{\left(-\frac{k}{k_B T_0}\right)}}$$

k is a constant here. The constant describes an effective barrier height at that point in time.

In this example, the apparatus 200 comprises a voltage and/or current source 212 for outputting the voltages. In this example, the apparatus 200 comprises a computing device 214, in particular a microprocessor, which is configured to carry out the methods described in the following. In this example, the apparatus 200 includes a memory 216 configured to store limit values or a characteristic curve from which limit values are determinable. In this example, the apparatus 200 comprises an output device 218, which is configured to output an output 220.

A memory, actuator, MEMS, memory, actuator, micromirror, printhead or speaker can comprise this apparatus for monitoring the semiconductor component 100 and the semiconductor component 100. Provision can be made for carrying out a lifetime monitoring for the memory, actuator, MEMS, micromirror, printhead or speaker in which the semiconductor component 100 is monitored.

Figure 16:
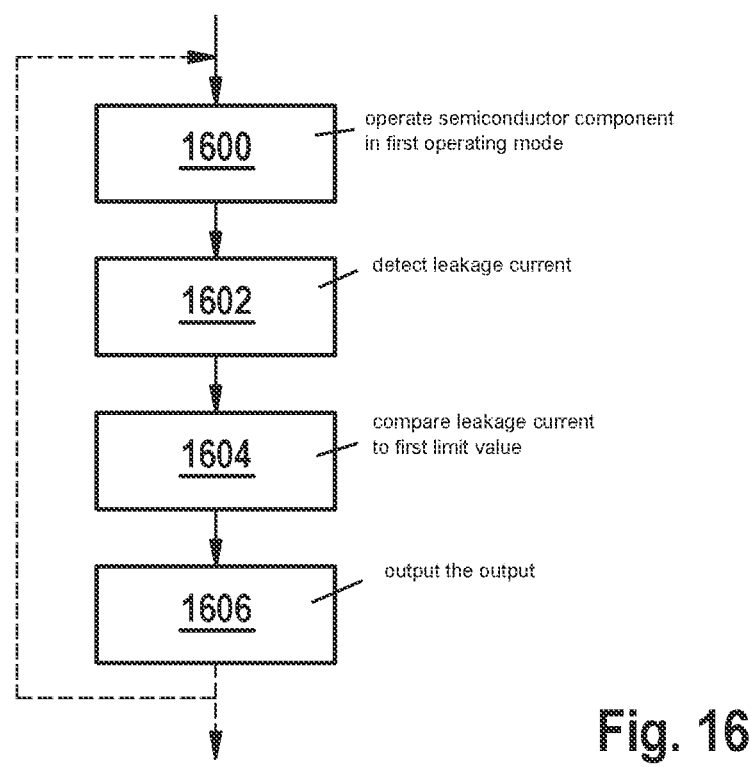
FIG. 16 shows a method for monitoring the semiconductor component, according to an example embodiment of the present invention.

The method for monitoring the semiconductor component 100 is described in the following with reference to FIG. 16.

In a step 1600, the semiconductor component 100 is operated in a first operating mode in which the first voltage U1 is applied.

In a step 1602, a leakage current I which flows through the first electrode 102 and the second electrode 104 of the semiconductor component 100 is detected during operation of the semiconductor component 100.

In a step 1604, in one aspect, the leakage current I is compared to a first limit value, e.g. one of leakage current levels 700, 800, 1400 for the leakage current I. In step 1604, the output 220 is determined on the basis of a result of the comparison. It can be provided that the first limit value is determined from a plurality of limit values which the leakage current I exceeds or falls below.

It can be provided that a voltage and/or temperature dependence of the leakage current I is taken into account. The limit value is determined as a function of the reference limit value G0 and the reference temperature T0, for example, in particular using the above-described exponential relationship.

In step 1604, in one aspect, a time at which an extreme point, in particular a maximum, of the leakage current I occurs can be determined. In this aspect, the output 220 can be determined depending on said time.

The output 220 includes a state of the semiconductor component 100.

It can be provided that the residual value of the service life of the semiconductor component 100 is determined depending on the first limit value. In that case, the output 220 can include this residual value.

It can be provided that the residual value of the service life of the semiconductor component 100 is determined depending on the time at which the extreme point, in particular the maximum, of the leakage current I occurs. In that case, the output 220 can include this residual value.

A text is determined, for example, which includes the state of the semiconductor component 100 and an indication of a remaining service life, e.g. the residual value. The residual value in this example is a period of time for which, starting from the time at which the leakage current I is detected, the semiconductor component 100 can still be operated with the first voltage U1 until the time at which the service life of the semiconductor component 100 ends occurs. The period of time is calculated, for example, starting from the time at which the leakage current I is detected using the above-described relationship for the movement of defects under the influence of the first voltage U1 until the time for the end of service life that is reasonable for the respective application.

In one aspect, a control signal that specifies an operating mode for the semiconductor component 100 is determined.

In a step 1606, the output 220 is output.

The text is sent in a message, for example, or output at a human-machine interface.

The control signal is output to control the semiconductor component 100 or a device comprising the semiconductor component 100 to operate in the operating mode, for example.

Step 1600 is then in particular carried out with the operating mode specified for this purpose. It can be provided that the method is terminated for any of the reasons described in the following.

It can be provided that the leakage current I is detected during operation of the semiconductor component 100 in the first operating mode and the operation of the semiconductor component 100 in the first operating mode is continued in step 1602 if the leakage current I exceeds the first limit value or if the residual value of the service life is greater than a first threshold value.

It can be provided that, in this case, a second limit value is then determined from the plurality of limit values and the operation of the semiconductor component 100 is either continued in a second operating mode or the operation is terminated if the leakage current I exceeds the second limit value. Thus, different measures are taken as the leakage current level increases.

It can alternatively be provided that the operation of the semiconductor component 100 is either continued in a second operating mode or is terminated. The operation can be continued in the second operating mode if the residual value of the service life is less than a second threshold value. The operation can be terminated if the residual value of the service life is greater than the second threshold value. Different measures can be taken as the residual value decreases.

The invention claimed is:

1. A method for monitoring a semiconductor component, comprising the following steps:
   detecting, by a measuring device during operation of the semiconductor component, a leakage current which flows through a first electrode and a second electrode of the semiconductor component;
   i) comparing, by a computing device, the leakage current with a first limit value for the leakage current and determining an output based on a result of the comparison and/or ii) determining, by the computing device, a time at which a maximum point of the leakage current occurs and determining the output based on the time, wherein the output includes a state of the semiconductor component; and outputting, by an output device, the output.

2. The method according to claim 1, wherein the first limit value which the leakage current exceeds or falls below is determined from a plurality of limit values, wherein a residual value of a service life of the semiconductor component is determined depending on the first limit value, and wherein the output includes the residual value.

3. The method according to claim 2, wherein the leakage current is detected during operation of the semiconductor component in a first operating mode, wherein the operation of the semiconductor component in the first operating mode is continued based on the leakage current exceeding the first limit value or based on the residual value of the service life being greater than a first threshold value.

4. The method according to claim 3, wherein a second limit value is determined from the plurality of limit values, wherein the operation of the semiconductor component is continued in a second operating mode or the operation is terminated based on the leakage current exceeding the second threshold value or the operation of the semiconductor component is continued in a second operating mode or the operation is terminated based on the residual value of the service life is greater than a second threshold value.

5. The method according to claim 4, wherein a reference limit value and a reference temperature are specified, a current temperature of the semiconductor component or an environment of the semiconductor component is determined, a factor is determined depending on the current temperature and the reference temperature, the reference limit value is scaled with the factor and the first limit value and/or the second limit value is determined depending on the reference limit value scaled with the factor.

6. The method according to claim 1, wherein a residual value of a service life of the semiconductor component is determined depending on the time at which the maximum point of the leakage current occurs, wherein the output includes the residual value.

7. The method according to claim 1, wherein a text including the state of the semiconductor component and an indication of a remaining service life is determined, wherein the text is sent in a message or output at a human-machine interface.

8. The method according to claim 1, further comprising:
determining a control signal specifying an operating mode for the semiconductor component; and
outputting the control signal to control the semiconductor component or a device including the semiconductor component to operate in the operating mode.

9. The method according to claim 1, wherein the leakage current is compared with the first limit value for the leakage current and the output is determined based on the result of the comparison.

10. The method according to claim 1, wherein the time at which the maximum point of the leakage current occurs is determined and the output is determined based on the time.

11. An apparatus configured to monitor a semiconductor component, comprising:
a measuring device;
a computing device; and
an output device;

wherein the measuring device is configured to detect, during operation of the semiconductor component, a leakage current which flows through a first electrode and a second electrode of the semiconductor component;

wherein: (i) the computing device is configured to compare the leakage current with a first limit value for the leakage current and determine an output depending on a result of the comparison, and/or (ii) the computing device is configured to determine a time at which a maximum point of the leakage current occurs and determine the output depending on the time;

wherein the output includes a state of the semiconductor component; and wherein the output device is configured to output the output.

12. The apparatus of claim 11, wherein the computing device compares the leakage current with the first limit value for the leakage current and determines the output depending on the result of the comparison.

13. The apparatus of claim 11, wherein the computing device determines the time at which the maximum point of the leakage current occurs and determines the output depending on the time.

14. A microelectromechanical system (MEMS) or memory or actuator or micromirror or printhead or speaker, comprising,
apparatus configured to monitor a semiconductor component, comprising:
a measuring device;
a computing device; and
an output device;

wherein the measuring device is configured to detect, during operation of the semiconductor component, a leakage current which flows through a first electrode and a second electrode of the semiconductor component;

wherein: (i) the computing device is configured to compare the leakage current with a first limit value for the leakage current and determine an output depending on a result of the comparison, and/or (ii) the computing device is configured to determine a time at which a maximum point of the leakage current occurs and determine the output depending on the time;

wherein the output includes a state of the semiconductor component; and wherein the output device is configured to output the output.

15. The MEMS or memory or actuator or micromirror or printhead or speaker of claim 14, wherein the computing device compares the leakage current with the first limit value for the leakage current and determines the output depending on the result of the comparison.

16. The MEMS or memory or actuator or micromirror or printhead or speaker of claim 14, wherein the computing device determines the time at which the maximum point of the leakage current occurs and determines the output depending on the time.

* * * * *